US009129379B2

(12) United States Patent
Sorgi et al.

(10) Patent No.: US 9,129,379 B2
(45) Date of Patent: Sep. 8, 2015

(54) METHOD AND APPARATUS FOR BILAYER IMAGE SEGMENTATION

(71) Applicant: THOMSON LICENSING, Issy de Moulineaux (FR)

(72) Inventors: Lorenzo Sorgi, Hannover (DE); Markus Schlosser, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/018,526

(22) Filed: Sep. 5, 2013

(65) Prior Publication Data

US 2014/0072212 A1 Mar. 13, 2014

(30) Foreign Application Priority Data

Sep. 11, 2012 (EP) .................................... 12306094
Dec. 19, 2012 (EP) .................................... 12306625

(51) Int. Cl.
*G06T 7/00* (2006.01)

(52) U.S. Cl.
CPC ............. *G06T 7/0079* (2013.01); *G06T 7/0081* (2013.01); *G06T 7/0093* (2013.01)

(58) Field of Classification Search
CPC ... G06T 7/0079; G06T 7/0081; G06T 7/0093; G06T 2207/10028; G06T 2207/20144; G06T 2207/20221; G06T 2207/30196
USPC ......... 382/164, 171, 103, 173, 203, 218, 154, 382/131, 165; 345/440, 108
See application file for complete search history.

(56) References Cited

U.S. PATENT DOCUMENTS 6,707,940 B1 3/2004 Qian
6,996,272 B2 2/2006 Chen et al.
7,400,767 B2 * 7/2008 Slabaugh et al. ............. 382/173
7,536,050 B2 * 5/2009 Boykov et al. ................ 382/173
7,680,314 B2 * 3/2010 Hong ............................ 382/131
7,724,256 B2 * 5/2010 Grady et al. .................. 345/440
8,942,917 B2 * 1/2015 Chrysanthakopoulos .... 701/410
2004/0032906 A1 2/2004 Lillig
2005/0244071 A1 * 11/2005 Zaharia et al. ................ 382/251
2007/0292025 A1 * 12/2007 Boykov et al. ................ 382/173
2011/0194762 A1 * 8/2011 Haibing ........................ 382/165
2012/0008852 A1 * 1/2012 Niu et al. ...................... 382/154
2012/0076361 A1 * 3/2012 Fujiyoshi ...................... 382/103
2012/0314949 A1 * 12/2012 Grady et al. .................. 382/173
2013/0011046 A1 * 1/2013 Choi et al. .................... 382/154

OTHER PUBLICATIONS

Boykov et al., "Interactive Graph Cuts for Optimal Boundary & Region Segmentation of Objects in N-D Imag", Proceedings of Internation Conference on Computer Vision, Vancouver, Canada, Jul. 2001, pp. 105-112.*

Arif et al.: Visual tracking and segmentation using Time-of-Flight sensor; 17th IEEE International Conference on Image Processing, vol., No., pp. 2241-2244, Sep. 26-29, 2010.

(Continued)

*Primary Examiner* — Mekonen Bekele
(74) *Attorney, Agent, or Firm* — Tutunjian & Bitetto, P.C.

(57) ABSTRACT

A method and an apparatus for bilayer image segmentation are described. A set of segmentation seeds for the image is generated by analyzing a depth histogram of the image. Then a segmentation map is generated by minimizing an objective function, which models a directed flow from the foreground segmentation seeds towards the background segmentation seeds.

23 Claims, 5 Drawing Sheets

Analyze depth histogram — 10
Generate set of segmentation seeds — 11
Minimize objective function — 12
Generate segmentation map — 13

(56) References Cited

OTHER PUBLICATIONS

Bleiweiss et al.: Fusing Time-of-Flight Depth and Color for Real-Time Segmentation and Tracking; In Proceedings of the DAGM 2009 Workshop on Dynamic 3D Imaging (Dyn3D '09). pp. 58-69. Springer-Verlag, Berlin, Heidelberg; Publication Date: Sep. 3, 2009.
Dal Mutto et al.: Scene Segmentation by Color and Depth Information and its Applications; In: STreaming Day, Udine, Italy (2010), pp. 1-5.
Forczek: Modeling of the colors distance function with use of knowledge about expected colors of objects; Zeszyty Naukowe Politechniki Slaskiej, Seria: Informatyka No. 37 273-85; Publication Date: Jan. 1, 1999, pp. 2.
He et al.: Graphcut-based interactive segmentation using colour and depth cues; Australasian Conf. on Robotics and Automation (ACRA 2010); Publication Date: Dec. 1, 2010, pp. 8.
Kim et al.: Facial region detection using range color information; IEICE Transactions on Information and Systems vol. E81-D, No. 9 968-75; Publication Date: Sep. 25, 1998.
Kolmogorov et al.: Bi-Layer Segmentation of Binocular Stereo Video; In Proceedings of the 2005 IEEE Computer Society Conference on Computer Vision and Pattern Recognition—vol. 2 , pp. 407-414; Publication Date: Jun. 20, 2005.
Leens et al.: Combining Color, Depth, and Motion for Video Segmentation; Proceedings of the 7th International Conference on Computer Vision Systems, pp. 104-113, 2009.
Ogale et al.: Shape and the Stereo Correspondence Problem; Int. J. Computer Vision 65, 3 (Dec. 2005), 147-162.
Piccardi: Background subtraction techniques—a review; Systems, Man and Cybernetics, 2004 IEEE International Conference on , vol. 4, No., pp. 3099-3104 vol. 4, Oct. 10-13, 2004.
Wang et al.: Automatic Natural Video Matting with Depth; Computer Graphics and Applications, 2007. PG'07. 15th Pacific Conference on , vol., No., pp. 469-472, Oct. 29, 2007-Nov. 2, 2007.
Wang et al.: Automatic Real-Time Video Matting Using Time-of-Flight Camera and Multichannel Poisson Equations; Int. Journal of Computer Vision 97 (2012) 104-121; Publication Date: Mar. 1, 2012.
Wang_etal_Image and Video Matting—A Survey; Found. Trends. Comput. Graph. Vis. 3, 2 (Jan. 2007), 97-175.
Wang et al.: Tofcut-Towards robust real-time foreground extraction using a time-of-flight camera; In: 3DPVT Conf. (2010); Publication Date: May 17, 2010.
Zhang et al.: Robust Bilayer Segmentation and Motion-Depth Estimation with a Handheld Camera; IEEE Transactions on Pattern Analysis and Machine Intelligence (TPAMI), 33(3): 603-617, Mar. 1, 2011.
Zhu et al.: Joint depth and alpha matte optimization via fusion of stereo and time-of-flight sensor; Computer Vision and Pattern Recognition, 2009. CVPR 2009. IEEE Conference on , vol., No., pp. 453-460, Jun. 20-25, 2009.
Fondon et al.: Color and texture based segmentation algorithm for multicolor textured images; VISAPP 2007. Proceedings of the Second International Conference on Computer Vision Theory and Applications; Publication Date: Mar. 8, 2007.
http_vis.uky.edu_ToFMatting.htm; Publication Date: Jan. 14, 2012.

* cited by examiner

METHOD AND APPARATUS FOR BILAYER IMAGE SEGMENTATION

This application claims the benefit, under 35 U.S.C. §119 of European Patent Application No. 12306094.9, filed Sep. 11, 2012 and European Patent Application No. 12306625.0, filed Dec. 19, 2012.

FIELD OF THE INVENTION

The invention relates to a method and an apparatus for bilayer image segmentation. More specifically, the invention concerns a method and an apparatus for bilayer image segmentation, which efficiently use color and depth data for segmentation.

BACKGROUND OF THE INVENTION

The term image segmentation denotes the art of automatically partitioning an image in a set of connected segments, where each of the segments can be individually classified as a single object. When the aim reduces to the identification of the closest object, then the algorithm is called bilayer segmentation, highlighting the fact that a single foreground object must be segmented from the remaining background scene.

One class of algorithms, denoted as Background Subtraction, assume that a foreground object moves in front of a static background and a video-sequence captured by an electro-optical camera is available as an input. In this context the color distribution of the background scene can be assumed constant or slowly variable and the temporal color variation of each pixel provides the local clue of a foreground. The most important drawback of such an approach is that a static foreground necessarily falls into the background layer.

During the last years active depth sensors have become available as off-the-shelf components and the research community has addressed its interest toward the simultaneous exploitation of color and depth data within several vision systems. For image segmentation, and even more for bilayer segmentation, the scene depth represents a strong additional cue, as it provides several additional benefits. The distance from the camera is indeed the feature defining what a foreground is, and therefore the depth data is carrying the richest information. Furthermore, range sensors are sufficiently independent of the lighting conditions and the scene depth does not suffer from ambiguous statistical distributions between foreground objects and the background scene. The latter are instead typical issues encountered in the color data.

However, depth images captured from active sensors typically have a low resolution and are affected by parallax displacement with respect to the corresponding color images due to the physical distance of the cameras' projection centers. Therefore, for a successful joint processing, depth maps and color images need to be registered, which is also a non-trivial task. For example, it has been proposed to use a super resolution technique to up-sample the depth map of a time-of-flight camera to the resolution of the main color camera. Furthermore, though passive depth estimation approaches, like stereo matching and structure from motion, do not suffer from these issues, they have their own difficulties. In order to combine the advantages of both passive and active depth sensors, a sensor setup comprised of a time-of-flight camera in conjunction with a stereo camera has been proposed.

Despite the resolution and alignment issues, certainly depth maps can be used to extract a rough initial segmentation in a fully automatic manner. Such segmentation allows for the construction of a rough trimap, where alpha matting techniques can be directly applied. However, a precise trimap, tightly aligned with the actual foreground contour, typically leads to much better alpha mattes. As a consequence, although the state of the art alpha matting schemes have been extended towards exploiting the depth information, their results still suffer from the rather broad initial trimap.

The research activities on binary segmentation using color and depth may be split into two camps, namely feature-level fusion and decision-level fusion. The approaches in the first group are typically based on a k-means clustering framework, to extract the image segments in the feature space, and the feature vectors are constructed using a weighted mixture of the color components and the pixel image location and the depth data.

On the other hand, basically all the decision-level fusion approaches employ a graph-cuts framework, where the depth is integrated into the data term as a statistically independent additional source of information. They typically use classical Bayesian inference. As an alternative, a voting scheme has been employed to combine the output of three separate classifiers based on background subtraction, color statistics and depth/motion consistency.

A remarkable aspect is that almost any graph based segmentation technique integrates the depth information only in the data term of the objective function. Only in O. Arif et al.: "*Visual tracking and segmentation using Time-of-Flight sensor*", 17th IEEE International Conference on Image Processing (2010), pp. 2241-2244 also the smoothness terms are computed as a function of the distance between neighboring pixels in color and space. However, this approach suffers from several drawbacks. The depth measure is simply added to the pixel coordinates to get a 3D space location, but the intrinsic difference in resolution and unit measure between the depth measure and the pixel coordinates is not directly taken into account. This leads to a non-isotropic scaling of the Euclidean space. Furthermore, no theoretical motivation is provided for the actual form of the smoothness terms, the depth is arbitrarily included in both the data term and smoothness term using heterogeneous functions. Besides, the depth is included asymmetrically only in the data term of the foreground pixels, whereas the data terms of the background pixels are charged only with a color based cost.

Many video and image editing applications, like clean background plate creation, background substitution, object tracking, 2D to 3D conversion, and many others, need a robust segmentation of the foreground object from the background scene. Currently the automatic tools are not sufficiently reliable for a massive exploitation on real operative scenarios and commonly the task is manually performed by an operator, drawing the silhouette of the segmentation target. This operation, called rotoscoping in the post-production industry, is extremely long and expensive.

Currently the most reliable techniques available in literature are based on graph cut, but interestingly the general trend of this class of algorithms is to embed the depth information only in the data term, whereas it can play a better role when embedded into the smoothness term.

Another issue, which raises in any graph based segmentation algorithm, is the definition of the most suitable function for the cost terms. In the typical probabilistic framework, the likelihood measures of the color and depth data are used. In this case the problem transfers to the online estimation of the best statistical models for the data. This is not a trivial task and in some case it provides only a poor discrimination capability, as the statistical distributions of the background and the foreground can be significantly overlapping. This happens mainly for the color data. However, if the probabilistic framework is dropped, some empirical function needs to be defined. In this case it is not clear how to compute the function parameters and how general they can be considered.

Also the computational cost of the graph based segmentation techniques can be a problem. Segmentation graphs can be naturally extended to three dimensional graphs when the whole video-sequence is processed in a single step, but in this case the overall computational cost becomes very high. Even when images are processed independently, the number of edges scales with the square of image resolution and, therefore, for HD sequences it is difficult to reach real time performances.

SUMMARY OF THE INVENTION

It is an object of the present invention to propose a solution for bilayer image segmentation, which efficiently makes use of color and depth data for segmentation.

According to the invention, a method for bilayer image segmentation comprises the steps of:

- generating a set of segmentation seeds for the image by analyzing a depth histogram of the image; and
- generating a segmentation map by minimizing an objective function, which models a directed flow from the foreground segmentation seeds towards the background segmentation seeds.

Accordingly, an apparatus for bilayer image segmentation is adapted to perform the steps of:

- generating a set of segmentation seeds for the image by analyzing a depth histogram of the image; and
- generating a segmentation map by minimizing an objective function, which models a directed flow from the foreground segmentation seeds towards the background segmentation seeds.

Similarly, a computer readable storage medium has stored therein instructions enabling bilayer segmentation of an image, which when executed by a computer, cause the computer to:

- generate a set of segmentation seeds for the image by analyzing a depth histogram of the image; and
- generate a segmentation map by minimizing an objective function, which models a directed flow from the foreground segmentation seeds towards the background segmentation seeds.

The bilayer segmentation is performed by minimizing an objective function computed taking into account both the color and depth data, by means of an oriented graph. The objective function is formulated accordingly with two assumptions. The first assumption is that the segmentation contour is aligned with high contrast both in the color image and the depth map. The second assumption is that the sign of the depth gradient carries significant information on the transition between the two layers. By definition, the foreground layer has a lower depth with respect to the background scene. Following this consideration it can safely be assumed that the most useful information for the bilayer segmentation is carried by the data gradients and it can be entirely embedded into the graph edges, which carry the smoothness terms. Experiments have indeed shown that the amplitude of the depth jump between neighboring pixels is the richest cue about the presence of a segmentation contour. Therefore, a cost based on the distance in color and depth is integrated into the smoothness terms.

By analyzing the distances in color and depth space, instead of the color and depth data itself, the probabilistic framework can entirely be estimated offline. This provides a high level of generality, as the same models can be applied to any video sequence, and it even gets rid of overlapping statistical distributions.

In addition, the proposed design allows to reduce the computational cost as within the edges carrying the smoothness terms enough information is embedded to obtain an accurate segmentation mask. Almost the entire set of data term edges may be dropped except for a small number used as seeds.

The processing pipeline is organized in two main steps. A set of segmentation seeds are initially extracted by analyzing the temporal stack of depth histograms. Then the segmentation map is obtained by minimizing an objective function, which models the directed flow from the foreground seeds towards the background seeds.

The first step allows the removal of the t-links from the graph, that is the edges carrying the data terms, and, therefore, it leads to a smaller sized graph and a faster processing. However, it is worth to notice that it is not mandatory. The proposed algorithm can also cope with the lack of this initialization step and run on the full graph. But even in this case, a few t-links should be enough as long as they provide a link from both layers towards the segmentation labels.

The solution according to the invention has several advantages. Some of these advantages shall be briefly discussed in the following.

Content independent distribution of color distance

- The color smoothness term is constructed using the magnitude of the distance in color space between neighboring pixels. Object contours generally coincide with a change in color, but the direction of the color gradient does not carry any useful information. The cost for a label change between two neighboring pixels is computed from the estimated probability that the observed color change at that location cannot be explained by the typical variation in color as it is present even in homogenous areas. This feature can be assumed content independent and, therefore, not only the model selection but also the model parameter estimation can be performed offline.
- The estimation of color likelihood inference is generally a difficult task, prone to numerical instability, under and over fitting, and often it can only provide a global inaccurate representation of the color data. Finally it is content dependent to such an extent that it may need to be estimated several times across the video sequence.
- The proposed solution overcomes these drawbacks. The content independent statistical model of color distance can be learnt offline from an arbitrary image dataset, and is reused for different video sequences. This is a remarkable advantage both in terms of data representation accuracy and processing time.

Content independent distribution of depth distance

- The estimation of depth likelihood inference is not as unstable as the estimation of color likelihood, but still represents a weak step. As in the case of color above, the cost for a label change at a specific location is again derived from the estimated probability that the observed change cannot be explained by usual variations. As there are, however, no abrupt depth jumps within objects, this time the probability is not only modeled for homogenous areas but for whole objects. More importantly, as transitions between the foreground and the background are searched, the observed depth jump need not only be of significant magnitude but also in the right direction. Consequently, the sign is kept during the modeling of the statistical distribution of the depth variation.

This content independent statistical model of the signed distance in depth space can again be learnt offline from an arbitrary image dataset, and is reused for different video sequences.

Removal of Data Terms

The magnitude of color distance and the signed depth distance between neighboring pixel carry the richest information for bilayer segmentation. In the proposed design these features are embedded into the smoothness terms and, therefore, the data terms can be dropped from the objective function, without lowering the algorithm performance compared with the state of the art. This leads to the construction of a smaller sized graph, which represents a significant advantage in terms of requirement of computational resources, in particular in the context of video segmentation, where a 3D graph is to be built from an arbitrarily long frame sequence.

The only requirement for the removal of data terms is that a few segmentation seed are provided to the system as input. In the present implementation the pixels belonging to the contours of the foreground and background areas identified by a rough segmentation trimap are used as seeds.

Probability Costs

The overall system is comprised in a probabilistic framework. The objective cost function comprises a weighted sum of smoothness terms given by probability measures, which are naturally bounded in the normalized interval [0,1]. The homogeneity of the different costs greatly simplifies the choice of the weighting factors for non-expert users. This aspect represent a great advantage for the actual exploitation of the segmentation system within an operative scenario. It is common practice, indeed, to design computer vision systems with complex configurations, which cannot be easily handled by any other than advanced users. The current problem formulation instead makes the main configuration easy and intuitive, and, therefore, suitable for the usage in a real working environment.

Bilayer segmentation is a low level tool, which is part of many computer vision applications:

Background Modeling

This processing is aimed at the creation of a background panoramic image from a set of still images, or a video sequence captured from a moving camera. The knowledge of the foreground subject provides an important support for the estimation of the panoramic geometry.

Background Substitution

This processing is aimed at the replacement of the background scene behind the foreground subject in a video sequence with a new one. Such an application needs the knowledge of an accurate segmentation mask.

2D to 3D Conversion

The conversion of a movie from 2D to 3D needs the accurate segmentation mask of subjects located at different depths, in order to apply the correct disparity field in post processing. The proposed segmentation system can be integrated within the 2D to 3D conversion pipeline, as long as at least one color sequence has its corresponding depth map. The latter can be provided as a sequence of range scans captured by an active sensor, a sequence of disparity maps computed from a passive stereo camera, or it can be an a-dimensional 3D model also computed from a single view using Structure From Motion.

Videoconferencing and Telepresence

This application allows remotely located people to cooperate and interact within a common virtual environment. The segmentation of the foreground subject from the video-sequences minimizes the volume of transferred data between the remote sites.

Alpha Matting

Alpha matting is the soft segmentation of video objects, with the simultaneous estimation of a continuous point-wise blending function between the foreground and background colors. For this purpose an accurate binary segmentation is needed in input, in order to restrict the processing domain to the actual contour of the target objects.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
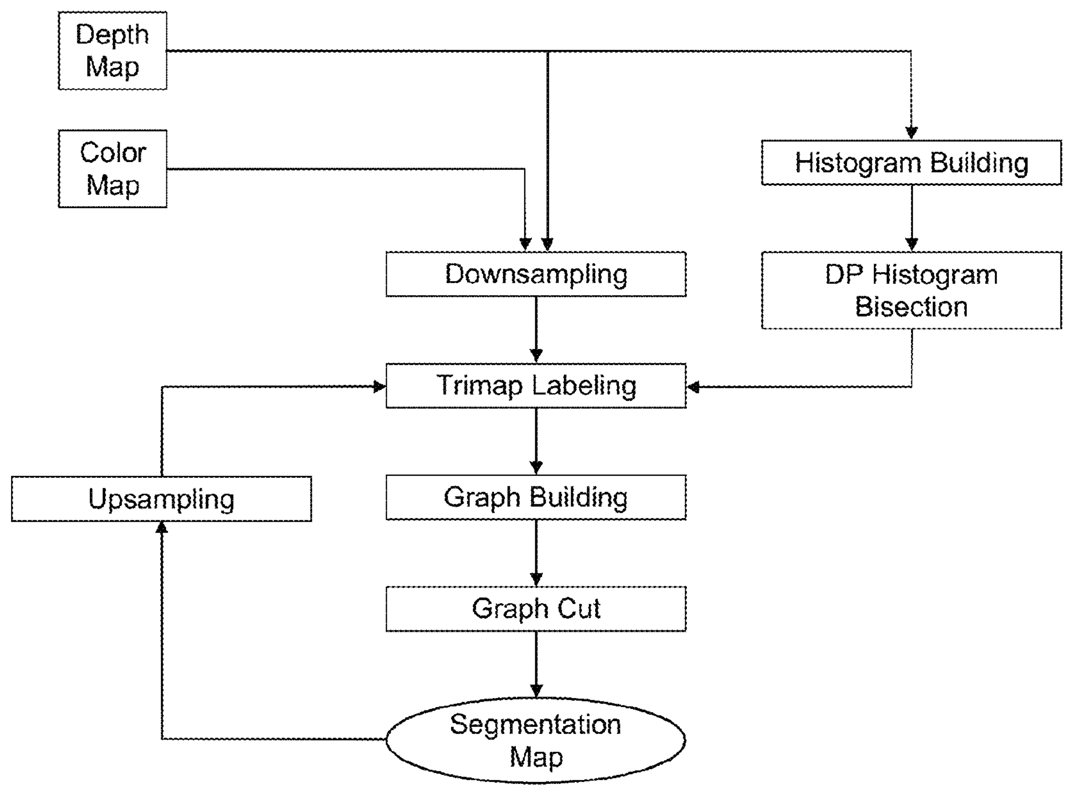
FIG. 1 shows the architecture of the proposed segmentation algorithm.

The architecture of the proposed segmentation algorithm is shown in FIG. 1. It comprises two main phases. In the initialization phase the sequence of depth histograms is stacked in a tridimensional array and the optimal bisection is extracted via Dynamic Programming. At each frame the bisecting depth value is used to detect highly reliable segmentation seeds. These together with the unknown area constitute a very rough trimap. This trimap is the input for the second phase, where the accurate binary segmentation is obtained as the solution to an optimization problem solved via graph-cut.

In the following it is assumed that a video sequence is processed. However, the algorithm applies as well to the case of still images. The only difference between the two cases is given by the number of edges established within the segmentation graph. In the case of still images, these are given only by the cliques of the 4-connected or the 8-connected neighborhoods. When a video sequence is processed instead, the pixel cliques are extended with additional edges computed using the background registration homographies. However, other approaches, based on feature tracking for example, are likewise applicable.

The initialization phase aims at extracting highly reliable seeds, i.e. small patches which are permanently labeled as foreground and background.

Figure 2:
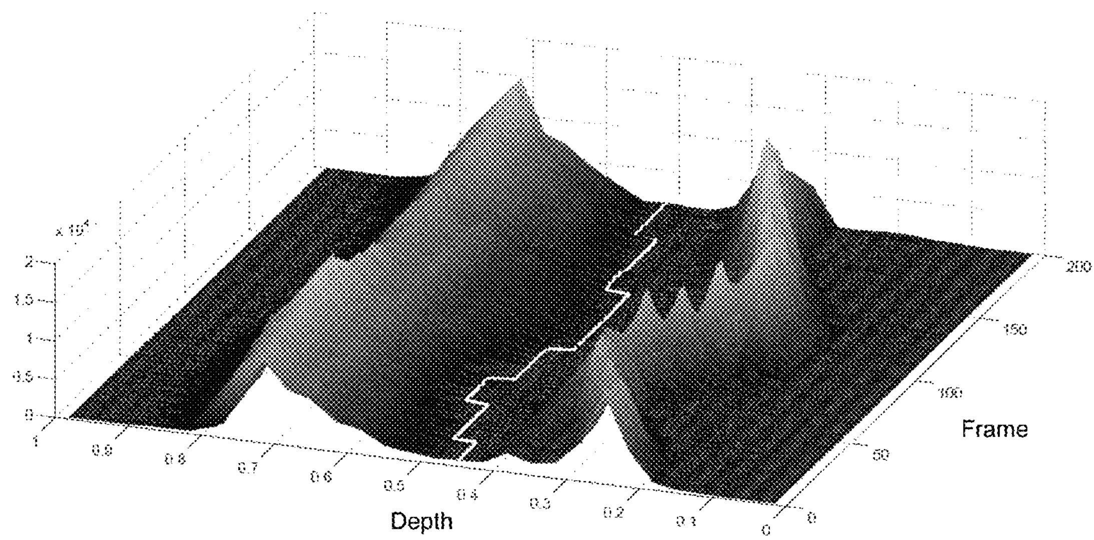
FIG. 2 depicts a temporal stack of depth histograms.

It is assumed that it is possible to detect such regions in two steps. First the depth value providing the optimal bisection of the depth histogram is estimated and then two different thresholds are computed and applied to the image. The first step is performed within a Dynamic Programming optimization framework, aimed at detecting the optimal valley path going through the temporal stack of depth histograms, as illustrated by the white line in FIG. 2.

Let $\hat{z}=\{0, \ldots, \hat{z}_k, 1\}$ denote N equidistant depth values ranging within the interval [0, 1], and $h_t=\{h_0, \ldots, h_k, h_{N-1k}\}$ the depth histogram of the t-th frame constructed over $\hat{z}$. The sequence of depth values corresponding to the optimal valley-path up to time t is denoted as $z_t=\{z_0, \ldots z_t\}$ and is estimated in a sequential way by minimizing the following cost function via Dynamic Programming:

$$z_t = \min_{z \in \hat{z}^t} \sum_{i=0}^{t} C_d(z_i, h_i) + \lambda C_s(z_i, z_{i-1}), \tag{1}$$

where $C_d(z,h)$ measures the quality of the histogram bisection given by z and $C_s(z_a,z_b)$ provides a regularization term weighted by the parameter λ. In the proposed design simply the Euclidean distance is used to model $C_s(\cdot)$ and the bisection quality measure $C_d(z,h)$ is given by a weighted sum the histogram bins contained within the valley.

In more detail, given a bisection index j the median values are computed from the histogram portions $\{h_k\}_{k=0 \ldots j}$ and $\{h_k\}_{k=j \ldots N-1}$, and the corresponding bin indexes f and b are rougly assumed to be the borders of the histogram valley. The bisection cost function is then computed as a pseudo-normalized sum of the histogram bins belonging to such valley:

$$C_d(z_j, h) = \frac{\sum_{k=f}^{b} h_k \cdot w_{n,k}}{\sum_{k=0}^{f} h_k \cdot w_{f,k}} + \frac{\sum_{k=f}^{b} h_k \cdot w_{n,k}}{\sum_{k=b}^{N-1} h_k \cdot w_{b,k}}, \tag{2}$$

where $w_{f,k}$, $w_{b,k}$, and $w_{n,k}$ are simple linear weights defined as:

$$w_{f,k} = \begin{cases} 1 & \text{if } k < f \\ \frac{f-k}{j-f} + 1 & \text{if } f \le k \le j \\ 0 & \text{if } k \ge f \end{cases} \tag{3}$$

$$w_{b,k} = \begin{cases} 0 & \text{if } k < j \\ \frac{k-j}{b-j} & \text{if } j \le k \le b \\ 1 & \text{if } k \ge b \end{cases} \tag{4}$$

$$w_{n,k} = 1-(w_{f,k}+w_{b,k}) \tag{5}$$

Figures 3, 4:
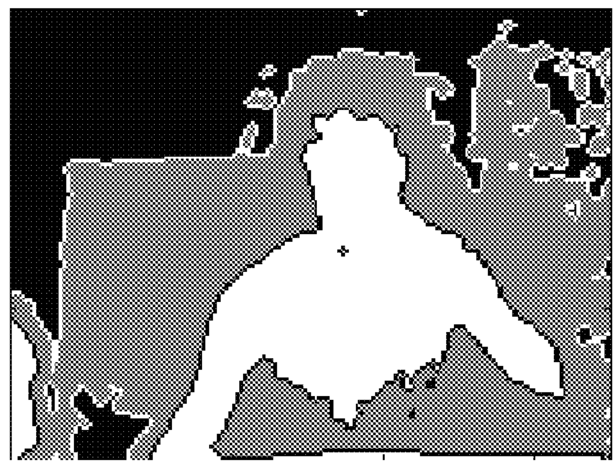
FIG. 3 shows a sample image.
FIG. 4 depicts a rough segmentation trimap extracted from the sample image of FIG. 3.

Once a successful bisection of the depth histogram is available the extraction of the segmentation seeds is quite straightforward. Based on the assumption that the values $\hat{z}_f$ and $\hat{z}_b$ represent a rough, but highly conservative, depth localization of the image layers, the pixels with depth higher than $\hat{z}_b$ or lower than $\hat{z}_f$ are permanently labeled as background and foreground, respectively. In FIG. 3 a sample image is depicted. FIG. 4 shows the corresponding rough segmentation trimap extracted at lower resolution.

Figure 5:
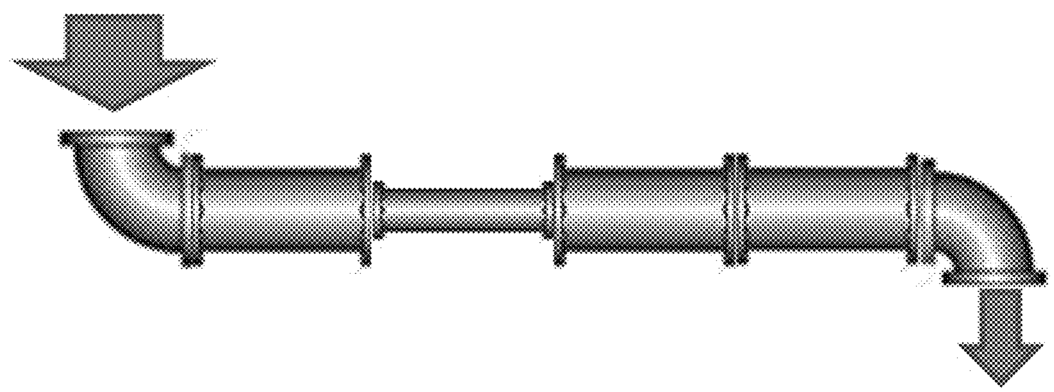
FIG. 5 shows a simple model of a graph with a single high capacity source and sink.

The segmentation mask of the unlabeled pixels is obtained by minimizing the following objective function:

$$\alpha = \min_{\alpha \in \mathbb{L}^M} \{E_c(\alpha) + E_z(\alpha)\}, \tag{6}$$

where $\mathbb{L}=\{F,B\}$ is the space of binary segmentation labels and $\alpha=[\alpha_0, \ldots, \alpha_{M-1}]^T \in \mathbb{L}^M$ is the labeling vector for the M unclassified pixels. The objective function is obtained as a weighted sum of two terms, computed as a function of distance in color and depth space, between each pair of differently labeled neighboring pixel:

$$\begin{cases} E_c(\alpha) = w_c \sum_{(i,j) | \alpha_i \ne \alpha_j} e_c(I_i, I_j) \\ E_z(\alpha) = w_z \sum_{(i,j) | \alpha_i \ne \alpha_j} e_z(z_i, z_j), \end{cases} \tag{7}$$

where $I_i$ and $z_i$ represent the color and depth data of the i-th pixel. Notice that in contrast to any other graph based segmentation algorithm no data term is taken into account. Instead, only the smoothness terms derived from the pixel pairs belonging to the segmentation contour contribute to the overall cost. The underlying motivation is simply sketched in FIG. 5, where an hydraulic network is shown with a single source and a single sink, both with ideally infinite capacity, and several pipe segments. The objective is measuring the network bottleneck, i.e. the maximum flow between the source and the sink. The present video segmentation problem can be represented by the same model, as the high capacity terminals can be attached to the segmentation seeds and the remaining network is set up using only the pixels in the unlabeled area. In particular, the terminals are set up along the seeds contours, as highlighted in FIG. 4, and via graph cut the minimum cost contour is computed, providing the transition from foreground to background.

This approach provides satisfactory results, as long a reliable measure of the probability of one-way transition from foreground to background can be embedded into the edge capacities. Preferably the statistical distribution of the distance in color and depth space between neighboring pixels is used for this purpose, under the condition of homogeneous labeling. These are denoted as $p_c(\|I_i-I_j\| | \alpha_i=\alpha_j)$ and $p_z((z_i-z_j) | \alpha_i=\alpha_j)$. The transition cost are then computed as $$\begin{cases} e_c(I_i, I_j) = 1 - P_c\{d_c < \|I_i - I_j\|\} \\ e_z(z_i, z_j) = P_z\{d_z < (z_i - z_j)\}, \end{cases} \tag{8}$$

where $p_c$ and $p_z$ are the distribution function obtained by integration of the likelihoods $p_c$ and $p_z$.

It is worth highlighting that both statistical models can be estimated offline from a generic dataset. The data distance between neighboring pixels indeed is a random variable whose statistical distribution is highly content independent. Therefore, the offline estimated models can be safely applied to any video sequence, getting rid of the need for statistics learning at runtime. Furthermore, the overall graph is reduced in size as few t-links are established between the pixel nodes and the graph terminal. This makes the overall computational cost noticeably lower than other graph based segmentation approaches.

Figure 6:
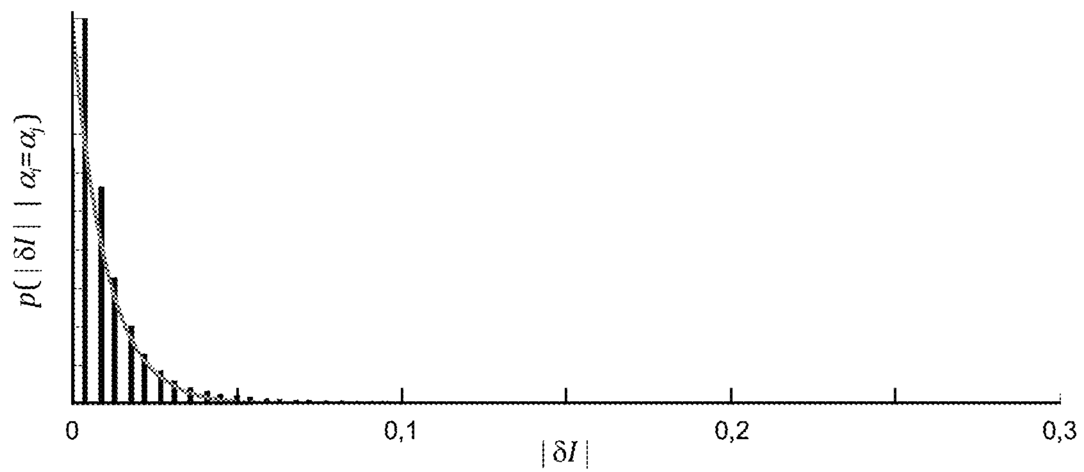
FIG. 6 illustrates an exponential model used to capture the distance in color space.
Figure 7:
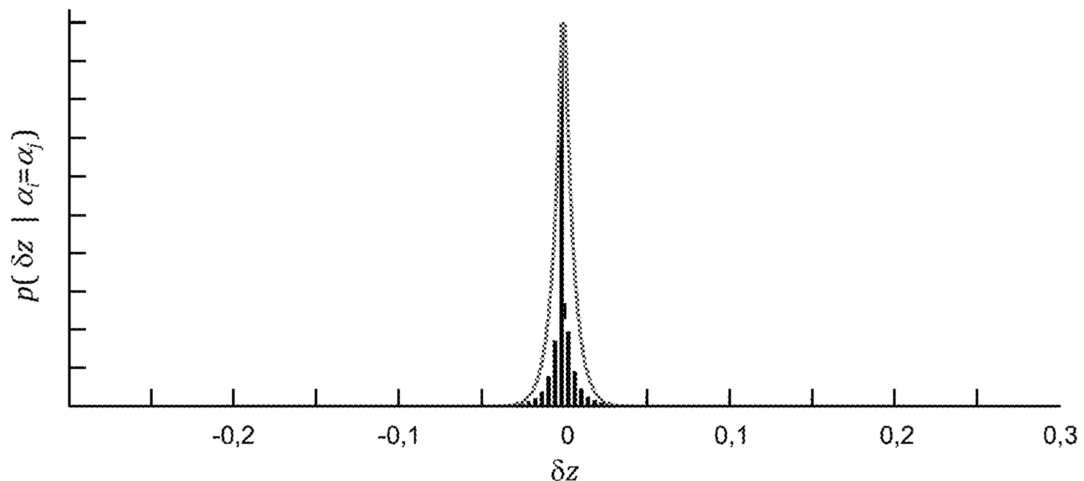
FIG. 7 illustrates a Laplace model used to capture the distance in depth space.

In FIGS. 6 and 7 the likelihood models $p_c$ and $p_z$, estimated offline from 1e6 data samples, are shown. The Exponential and the Laplace distribution have been chosen to model the color and depth distance. The underlying motivation is related to the design of the segmentation graph. The t-links towards the source terminal are connected to the foreground seeds, whereas the background seeds are connected to the sink. Therefore, the graph flow has a constrained direction from foreground to background. The distance in color space provides a reliable clue for the presence of a label swap between two neighbor pixels, but it carries no information regarding the actual type of swap. The depth distance instead is a more powerful indicator, as a transition from foreground to background is more likely when the depth difference has high magnitude and negative sign. For this reason the Laplace model is used for the depth data, as it preserves the information carried by the depth distance sign.

Table 1 shows the results obtained on a data set freely available at http://vis.uky.edu/gravity/Research/ToFMatting/ToFMatting.htm with the corresponding ground truth. The weights are empirically set to $w_c$=1.0 and $w_z$=0.8.

TABLE 1

Comparison between the proposed segmentation technique and TofCut obtained on four test video sequences.

| Seq. ID | # Frames | % Err TofCut | % Err X |
|---|---|---|---|
| WL | 200 | 1.35 | 0.23 |
| MS | 400 | 0.51 | 0.40 |
| MC | 300 | 0.15 | 0.02 |
| CW | 300 | 0.38 | 0.20 |

The mean percentage error computed over the whole image and across the whole sequence is provided. The performance achieved by TofCut is available in L. Wang et al.: "Tofcut: Towards robust real-time foreground extraction using a time-of-flight camera", Proceedings of the Fifth International Symposium on 3D Data Processing, Visualization and Transmission (3DPVT) (2010). In this document also other techniques have been tested, all underperforming with respect to TofCut.

In summary, the invention proposes an algorithm for video bilayer segmentation based on graph cut. The optimal valley path going through the depth data histogram is used for a robust initialization of the segmentation seeds. Then a small sized graph is built using the color and depth data provided by the pixels belonging to the unclassified region. The remarkable aspect of the algorithm is that the segmentation mask is computed by minimizing an objective function, which sums up only the intra-clique coherence terms. These are given by conditional probabilities of the distance in color and depth space between spatial and temporal neighbors. In contrast to other graph based segmentation techniques, which for each pixel establish a t-link carrying the likelihoods of pixel data, according to the invention only the source seed has the duty to flood the graph.

The proposed approach has two advantages. First it requires as input only statistical distributions, which can be estimated offline as both the distance in color and depth between neighbor pixel can be safely assumed content independent. Besides, the lack of t-links implies a significant reduction of the graph size. Therefore, the overall algorithm complexity is significantly reduced, but still the obtained results show a comparable level of performance with respect to other algorithms at the state of the art. The approach thus is a valuable alternative for the integration of real time applications running on low power platforms.

Figure 8:
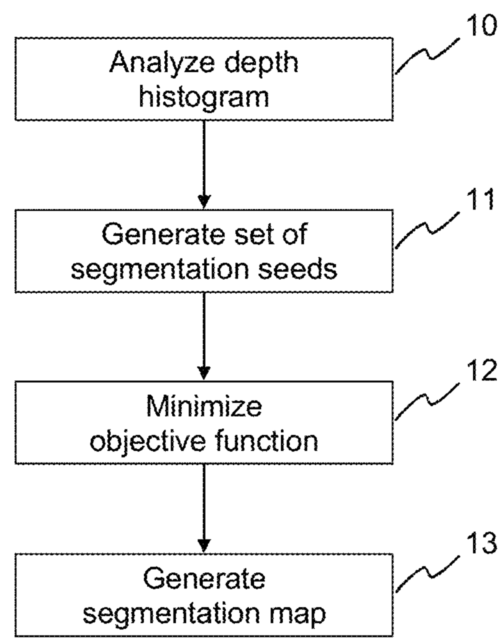
FIG. 8 schematically illustrates a method according to the invention for generating a confidence map.

FIG. 8 schematically illustrates a method according to the invention for bilayer image segmentation. In a first step a depth histogram of the image is analyzed 10. The analysis result is the used for generating 11 a set of segmentation seeds. Subsequently an objective function, which models a directed flow from the foreground segmentation seeds towards the background segmentation seeds, is minimized 12 for generating 13 a segmentation map.

Figure 9:
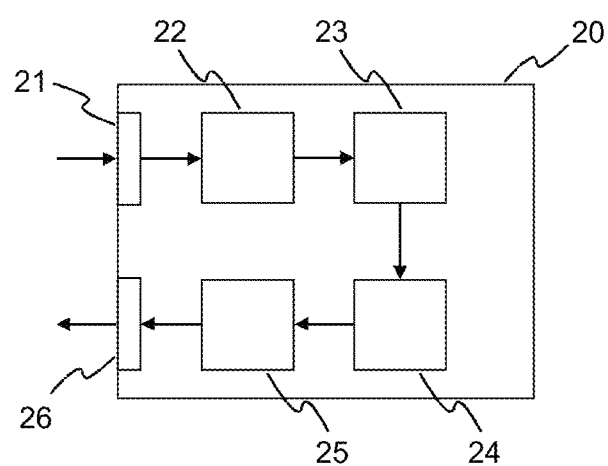
FIG. 9 depicts an apparatus adapted to perform the method of FIG. 9.

An apparatus 20 configured to perform the method according to the invention is schematically depicted in FIG. 9. The apparatus 20 comprises an input 21 for receiving an. A depth histogram analyzer 22 analyzes 10 a depth histogram of the image. The analysis result is provided to a segmentation seed generator 23, which generates 11 a set of segmentation seeds for the image. Based on the segmentation seeds a function minimizer 24 minimizes 12 an objective function, which models a directed flow from the foreground segmentation seeds towards the background segmentation seeds. Using the result output by the function minimizer 24, a segmentation map generator 25 generates 13 a segmentation map. The resulting segmentation map is output via an output 26. Of course, two or more of the various units may likewise be fully or partially combined into a single unit or implemented as software running on a processor.

The invention claimed is:

1. A method for bilayer segmentation of an image from a sequence of images comprising:
- generating a set of segmentation seeds for the image by analyzing a temporal stack of depth histograms of the sequence of images; and
- generating a segmentation map by minimizing an objective function, which models a directed flow from the foreground segmentation seeds towards the background segmentation seeds.

2. The method according to claim 1, further comprising computing the objective function taking into account color data and depth data.

3. The method according to claim 2, further comprising analyzing distances in color space and in depth space for the objective function.

4. The method according to claim 1, further comprising minimizing the objective function using a graph-cut approach.

5. The method according to claim 1, further comprising extracting an optimal bisection from the stack of depth histograms using a dynamic programming approach.

6. The method according to claim 5, wherein at each frame the bisecting depth value is used to detect segmentation seeds.

7. An apparatus for bilayer segmentation of an image from a sequence of images comprising:
- a depth histogram analyzer configured to analyze a temporal stack of depth histograms of the sequence of images;
- a segmentation seed generator configured to generate a set of segmentation seeds for the image using the result output by the depth histogram analyzer;
- a function minimizer configured to minimize an objective function, which models a directed flow from the foreground segmentation seeds towards the background segmentation seeds; and
- a segmentation map generator configured to generate a segmentation map using the result output by the function minimizer.

8. The apparatus according to claim 7, wherein the function minimizer is further configured to compute the objective function taking into account color data and depth data.

9. The apparatus according to claim 8, wherein the function minimizer is further configured to analyze distances in color space and in depth space for the objective function.

10. The apparatus according to claim 7, wherein the function minimizer is further configured to minimize the objective function using a graph-cut approach.

11. The apparatus according to claim 7, wherein the segmentation seed generator is further configured to extract an optimal bisection from the stack of depth histograms using a dynamic programming approach.

12. The apparatus according to claim 11, wherein the segmentation seed generator is further configured to use the bisecting depth value at each frame to detect segmentation seeds.

13. A computer non transitory readable storage medium having stored therein instructions enabling bilayer segmentation of an image from a sequence of images, which when executed by a computer, cause the computer to:

generate a set of segmentation seeds for the image by analyzing a temporal stack of depth histograms of the sequence of images; and generate a segmentation map by minimizing an objective function, which models a directed flow from the foreground segmentation seeds towards the background segmentation seeds.

14. The computer non transitory readable storage medium according to claim 13, wherein the instructions further cause the computer to compute the objective function taking into account color data and depth data.

15. The computer non transitory readable storage medium according to claim 14, wherein the instructions further cause the computer to analyze distances in color space and in depth space for the objective function.

16. The computer non transitory readable storage medium according to claim 13, wherein the instructions further cause the computer to minimize the objective function using a graph-cut approach.

17. The computer non transitory readable storage medium according to claim 13, wherein the instructions further cause the computer to extract an optimal bisection from the stack of depth histograms using a dynamic programming approach.

18. The computer non transitory readable storage medium according to claim 17, wherein the instructions further cause the computer to use the bisecting depth value at each frame to detect segmentation seeds.

19. An apparatus for bilayer segmentation of an image from a sequence of images comprising:

means for generating a set of segmentation seeds for the image by analyzing a temporal stack of depth histograms of the sequence of images; and means for generating a segmentation map by minimizing an objective function, which models a directed flow from the foreground segmentation seeds towards the background segmentation seeds.

20. The apparatus according to claim 19, further comprising means for computing the objective function taking into account color data and depth data.

21. The apparatus according to claim 20, further comprising means for analyzing distances in color space and in depth space for the objective function.

22. The apparatus according to claim 19, further comprising means for minimizing the objective function using a graph-cut approach.

23. The apparatus according to claim 19, further comprising means for extracting an optimal bisection from the stack of depth histograms using a dynamic programming approach.

* * * * *